(12) United States Patent
Schmida et al.

(10) Patent No.: US 11,691,207 B2
(45) Date of Patent: Jul. 4, 2023

(54) CHAMFER TOOL

(71) Applicant: Hartmetall-Werkzeugfabrik Paul Horn GmbH, Tuebingen (DE)

(72) Inventors: Peter Paul Schmida, Muenster (AT); Manfred Josef Schwaiger, Radstadt (AT)

(73) Assignee: Hartmetall-Werkzeugfabrik Paul Horn GmbH, Tuebingen (DE)

( * ) Notice: Subject to any disclaimer, the term of this patent is extended or adjusted under 35 U.S.C. 154(b) by 0 days.

(21) Appl. No.: 17/155,849

(22) Filed: Jan. 22, 2021

(65) Prior Publication Data
US 2021/0138564 A1    May 13, 2021

Related U.S. Application Data

(63) Continuation of application No. PCT/EP2019/071898, filed on Aug. 15, 2019.

(30) Foreign Application Priority Data

Aug. 16, 2018   (DE) ..................... 10 2018 119 927.9

(51) Int. Cl.
   *B23C 5/12*   (2006.01)
   *B23C 5/10*   (2006.01)

(52) U.S. Cl.
   CPC .......... *B23C 5/1018* (2013.01); *B23C 5/1081* (2013.01); *B23C 2220/16* (2013.01);
   (Continued)

(58) Field of Classification Search
   CPC . B23C 2220/16; B23C 5/1018; B23C 5/1081; B23C 5/12; B23C 5/10;
   (Continued)

(56) References Cited

U.S. PATENT DOCUMENTS 1,957,348 A * 5/1934 Skeel .................. B23D 77/044
                                                    408/239 R
4,527,643 A   7/1985 Horton et al.
(Continued)

FOREIGN PATENT DOCUMENTS

CN         104084648 A    10/2014
CN         204135426 U     2/2015
(Continued)

OTHER PUBLICATIONS

DE102017206144B3 (Translation) obtained at https://worldwide.espacenet.com/patent/search/family/062813167/publication/DE102017206144B3?q=102017206144 (Last visited Feb. 4, 2021) (Year: 2018).*

(Continued)

*Primary Examiner* — Alan Snyder
(74) *Attorney, Agent, or Firm* — Jason H. Vick; Sheridan Ross, P.C.

(57) ABSTRACT

A chamfer tool which comprises a tool holder. The tool holder extends along a central axis and comprises a plurality of slot-shaped cutting insert receptacles, each having two opposing lateral abutment surfaces and a base abutment surface arranged between the two lateral abutment surfaces and extending transversely thereto. The chamfer tool further comprises a plurality of cutting inserts, which are fixed in the plurality of cutting insert receptacles in a firmly bonded manner, wherein each of the cutting inserts comprises two opposing lateral surfaces, which abut against or are connected in a firmly bonded manner to the two lateral abutment surfaces of the respective cutting insert receptacle, and a lower surface arranged between the two lateral surfaces and extending transversely thereto, wherein the lower surface abuts against or is connected in a firmly bonded manner to the base abutment surface of the respective cutting insert receptacle. The cutting inserts project out of the first cutting (Continued)

insert receptacles both in an axial direction, which is parallel to the central axis of the tool holder, and transversely to the axial direction. Each of the cutting inserts comprises a main cutting edge which is oriented at a first acute angle to the central axis of the tool holder.

10 Claims, 3 Drawing Sheets

(52) U.S. Cl.
CPC ...... *B23C 2222/28* (2013.01); *B23C 2226/18* (2013.01); *B23C 2226/315* (2013.01)

(58) Field of Classification Search
CPC . B23C 3/126; B23C 2265/08; B23C 2240/08; B23C 2210/16; B23B 2220/04; B23B 2220/0485; B23B 5/16; B23B 29/034; B23B 51/103; B23B 51/102; B23B 51/10
See application file for complete search history.

(56) References Cited

U.S. PATENT DOCUMENTS

| | | | |
|---|---|---|---|
| 4,988,241 A | | 1/1991 | Colligan |
| 5,647,699 A | * | 7/1997 | Martin ................... B27G 13/12 407/50 |
| 5,685,671 A | | 11/1997 | Packer et al. |
| 5,765,973 A | | 6/1998 | Hirsch et al. |
| 6,984,093 B1 | | 1/2006 | Hauschild et al. |
| 9,981,317 B2 | | 5/2018 | McClymont |
| 2020/0070258 A1 | | 3/2020 | Kress |

FOREIGN PATENT DOCUMENTS

| | | | | |
|---|---|---|---|---|
| CN | 204997121 U | | 1/2016 | |
| CN | 107538083 A | | 1/2018 | |
| CN | 109500437 A | * | 3/2019 | ............. B23C 3/126 |
| DE | 1695895 U | | 3/1955 | |
| DE | 1402898 A | | 7/1969 | |
| DE | 19505079 A1 | | 11/1995 | |
| DE | 102008023266 A1 | | 11/2009 | |
| DE | 102017206144 B3 | | 7/2018 | |
| GB | 896644 A | | 5/1962 | |
| JP | S59-187989 A | | 10/1984 | |
| JP | H06-170629 | | 6/1994 | |
| KR | 10-2014-0094692 A | | 7/2014 | |
| RU | 2163859 C2 | | 3/2001 | |
| RU | 2399747 01 | | 9/2010 | |
| SU | 814593 A1 | | 3/1981 | |
| WO | WO-2010142747 A1 | * | 12/2010 | ............... B23C 3/18 |

OTHER PUBLICATIONS

English translation of WO-2010142747-A1 (Year: 2010).*
Office Action, Including Translation, for Russian Application No. 2020143345/05(080871), dated Aug. 24, 2021.
International Preliminary Report on Patentability for International Application No. PCT/EP2019/071898, dated Feb. 25, 2021.
Notification of Reason for Rejection (Including Translation) for corresponding Japanese Patent Application No. 2021-502776, dated Feb. 1, 2022.
International Search Report for International Application No. PCT/EP2019/071898, dated Oct. 4, 2019.
Written Opinion for International Application No. PCT/EP2019/071898, dated Oct. 4, 2019.

* cited by examiner

CHAMFER TOOL

CROSS REFERENCE TO RELATED APPLICATIONS

This application is a continuation of international patent application PCT/EP2019/071898, filed on Aug. 15, 2019 designating the U.S., which international patent application has been published in German language and claims priority from German patent application DE 10 2018 119 927.9, filed on Aug. 16, 2018. The entire contents of these priority applications are incorporated herein by reference.

BACKGROUND

This disclosure relates to a chamfer tool for producing a chamfer on a workpiece.

A chamfer produced with the presented chamfer tool is also referred to as a beveled surface on a workpiece edge. Often, a chamfer produced with the presented chamfer tool is a rotationally symmetrical chamfer, which has the shape of a conical segment surface.

The process of creating a chamfer is typically referred to as "chamfering". Typically, chamfers are applied to workpieces to remove burrs, reduce the risk of injury, and/or simplify further assembly. For internal and external threads, a 45°-chamfer or 60°-chamfer is typically applied to the bore, which prevents the first threads from being forced out and makes it easier to apply the cutting tools for cutting the internal and external threads to the workpiece. Workpieces into which a second workpiece is inserted are also chamfered. In such case the chamfer serves as an insertion aid.

The presented chamfer tool is particularly suitable for machining workpieces made of sintered cemented carbide or ceramics. However, the use of the chamfer tool is not limited to the machining of workpieces made of such materials; nevertheless, this is the preferred application.

Sintered cemented carbide has a very high hardness. In addition to its use as a cutting material, sintered cemented carbide is also frequently used in forming technology as a punch, hammer or as a wear part. The chamfering of such components made of sintered cemented carbide is traditionally carried out mainly by grinding, and in some cases also by eroding. Solid cemented carbide chamfer tools whose cutting edges are coated with a diamond layer are also known. However, the service life of such solid cemented carbide chamfer tools with diamond-coated cutting edges is very short, so that the use of such chamfer tools has proven to be cost-intensive. In addition, the cutting edges must be ground very precisely, which makes their manufacture complex and thus also cost-intensive. Due to the machining of the cutting edges by means of grinding, the cutting edges must also be relatively large, or at least the receptacle for the cutting edges on the tool holder must be relatively large in order to make the cutting edges accessible for the grinding tool. Accordingly, only relatively few cutting edges or cutting inserts can be attached to smaller tool holders.

SUMMARY

It is an object to provide a chamfer tool that overcomes the above-mentioned problems and is particularly suitable for machining sintered cemented carbide or ceramics.

According to a first aspect, a chamfer tool is presented, comprising:

a tool holder, which extends along a central axis and comprises a plurality of slot-shaped cutting insert receptacles that are arranged distributed around a circumference of the tool holder, wherein each of the plurality of cutting insert receptacles comprises two opposing lateral abutment surfaces and a base abutment surface arranged between the two lateral abutment surfaces and extending transversely thereto, the abutment surface of each of the plurality of cutting insert receptacles forming a base of the respective cutting insert receptacle;

a plurality of cutting inserts, wherein each of the plurality of cutting inserts is fixed in one of the plurality of cutting insert receptacles, respectively, in a firmly bonded manner, wherein each of the plurality of cutting inserts comprises two opposing lateral surfaces, which abut against or are connected in a firmly bonded manner to the two lateral abutment surfaces of the respective one of the plurality of cutting insert receptacles in which the respective cutting insert is fixed, and a lower surface arranged between the two lateral surfaces and extending transversely thereto, wherein the lower surface of each of the plurality of cutting inserts abuts against or is connected in a firmly bonded manner to the base abutment surface of the respective one of the plurality of cutting insert receptacles in which the respective cutting insert is fixed, wherein each of the plurality of cutting inserts projects out of the respective one of the plurality of cutting insert receptacles both in an axial direction, which is parallel to the central axis of the tool holder, and transversely to the axial direction, and wherein each of the plurality of cutting inserts comprises a main cutting edge which is oriented at a first acute angle to the central axis of the tool holder.

According to a refinement, the tool holder is made of cemented carbide and the cutting inserts are made of CVD thick-film diamond. The configuration of the tool holder made of cemented carbide allows for an extremely stable basic structure of the chamfer tool. The configuration of the plurality of cutting inserts made of CVD thick-film diamond enables the production of extremely precise cutting edges that have excellent frictional properties and a high hardness. The firmly bonded connection of the cutting inserts in the slot-shaped or groove-shaped cutting insert receptacles creates an extremely stable connection between the cutting inserts and the tool holder, which enables very high torques to be transmitted.

The slot-shaped or groove-shaped configuration of the cutting insert receptacles also enables an extremely space-saving attachment of the cutting inserts to the tool holder. The above-mentioned features thus make it possible to realize an extremely stable and high-precision chamfer tool which, compared to chamfer tools known from the prior art, enables long service lives and can thus be manufactured comparatively inexpensively despite the somewhat higher costs for the cutting insert if it is made of CVD thick-film diamond. Due to the immense stability of the cutting inserts, of the tool holder as well as of their connection, it is possible with the chamfer tool to machine high-hardness materials efficiently and with low stress.

The machining of the workpiece, i.e. the chamfering, is predominantly performed by means of the main cutting edge of the cutting inserts, which is referred to herein as the first main cutting edge. This first main cutting edge is oriented at an acute angle relative to the central axis of the tool holder, the size of which is preferably in the range of 30° to 60°. To produce a chamfer with a chamfer angle of 45°, a cutting insert is preferably used whose main cutting edge encloses an angle of 45° with the central axis. To produce a chamfer with a chamfer angle of 60°, a cutting insert is preferably used whose main cutting edge encloses an angle of 30° with the central axis. To produce a chamfer with a chamfer angle of 30°, a cutting insert is preferably used whose main cutting edge encloses an angle of 60° with the central axis. Of course, angles in between are also possible accordingly.

The chamfer tool is preferably configured with a plurality of cutting inserts. However, only one cutting insert is generally sufficient for the function of the chamfer tool. The chamfer tool can be equipped with one, two, three, four, five, six or even more cutting inserts. The cutting inserts preferably all have the same shape and size. They are arranged in corresponding cutting insert receptacles, which are designed as slot-shaped or groove-shaped cutting insert receptacles. The cutting inserts and the cutting insert receptacles, respectively, are preferably evenly distributed around the circumference of the tool holder.

Even though the chamfer tool preferably comprises a plurality of cutting inserts and a corresponding plurality of cutting insert receptacles, for the sake of simplicity, it is in the following referred to only one cutting insert (herein referred to as "first cutting insert") and only one cutting insert receptacle (herein referred to as "first cutting insert receptacle"). However, this shall not be regarded as limiting the scope of protection.

According to a refinement, the two opposing lateral surfaces of the first cutting insert are soldered to the two lateral abutment surfaces of the first cutting insert receptacle. Thus, a first of the two lateral surfaces is soldered to a first of the two lateral abutment surfaces and a second of the two lateral surfaces is soldered to a second of the two lateral abutment surfaces. Similarly, the lower surface of the first cutting insert is soldered to the base abutment surface of the first cutting insert receptacle.

The first cutting insert is according to this refinement thus soldered to the tool holder on three of its sides. This creates an extremely stable and sustainable connection between the first cutting insert and the first cutting insert receptacle, which enables the transmission of high torques. Soldering the first cutting insert in the first cutting insert receptacle also has the advantage that the interface between the cutting insert and the cutting insert receptacle is subjected to a relatively uniform load during machining of a workpiece. On the other hand, a point load, as would occur if the first cutting insert were fastened by means of a screw, could lead to fracture of the cutting insert, since the CVD thick-film diamond from which the first cutting insert is made has a high hardness, but at the same time is relatively brittle. Such a threat of fracture of the first cutting insert can be effectively avoided by soldering the first cutting insert on three sides.

Alternatively, the first cutting insert could also be welded to the first cutting insert receptacle. However, soldering the first cutting insert to the tool holder is simpler and therefore more cost-effective.

According to a refinement, the two lateral abutment surfaces of the first cutting insert receptacle are preferably oriented parallel to each other.

On the one hand, this enables a relatively simple insertion of the first cutting insert into the first cutting insert receptacle and thus simple a fastening of the first cutting insert in the first cutting insert receptacle. On the other hand, this optimizes the force transmission between the tool holder and the first cutting insert.

According to a refinement, a distance between the two lateral abutment surfaces of the first cutting insert receptacle is greater than a distance between the two lateral surfaces of the first cutting insert.

In other words, the first cutting insert receptacle is wider than the first cutting insert. This simplifies the mounting of the first cutting insert on the tool holder and also makes it possible, in the case of soldering the cutting insert to the tool holder, to bring the solder (soldering material) into the space between the first cutting insert and the first cutting insert receptacle during the manufacture of the chamfer tool. Thus, the first cutting insert is preferably not pressed into the first cutting insert receptacle, but merely inserted therein and subsequently soldered. This reduces the internal stresses within the tool holder and the cutting insert.

According to a refinement, the two lateral abutment surfaces of the first cutting insert receptacle are oriented parallel to a radial direction or at an angle <5° to the radial direction, wherein the radial direction is orthogonal to the central axis of the tool holder.

It is particularly preferred to orient the two lateral abutment surfaces transversely (i.e. not parallel) at an angle <5° is, as this produces a rake angle.

According to a refinement, the two lateral abutment surfaces of the first cutting insert receptacle are oriented parallel to the central axis of the tool holder or at an angle <5° to the central axis of the tool holder.

Again, it is preferred that the two lateral abutment surfaces are oriented at an angle <5° to the central axis of the tool holder, as this creates a set angle that reduces the load on the first main cutting edge.

According to a refinement, the first cutting insert projects beyond a front end of the tool holder and the tool holder comprises, in the area of the front end, a conical segment surface which is interrupted by the first slot-shaped cutting insert receptacle. Preferably, a half opening angle of this conical segment surface is equal to the first acute angle measured between the first main cutting edge and the central axis of the tool holder.

The first main cutting edge thus preferably runs parallel to the aforementioned conical segment surface. On the one hand, this prevents collisions between the workpiece to be machined and the tool holder. On the other hand, it creates a relatively large chip space that can be used for chip removal.

According to a refinement, the first cutting insert comprises a first secondary cutting edge that is oriented parallel to the central axis of the tool holder or at an angle <5° to the central axis of the tool holder.

Preferably, the first secondary cutting edge is oriented parallel to the central axis of the tool holder. The first secondary cutting edge can either serve to provide lateral support or be used to form a double chamfer (produced by the first main cutting edge and the first secondary cutting edge). The first main cutting edge and the first secondary cutting edge are preferably oriented at an obtuse angle (>90°) to each other.

According to a refinement, the first cutting edge comprises a second secondary cutting edge that is oriented at an angle of 85°-90° to the central axis of the tool holder.

This second secondary cutting edge preferably runs in the radial direction (orthogonal to the central axis) of the tool holder or slightly inclined thereto. It preferably forms the end face of the first cutting insert. Since the first cutting insert projects in the axial direction beyond the tool holder, the second secondary cutting edge preferably also forms the front end of the entire chamfer tool. The second secondary cutting edge preferably encloses an obtuse angle (>90°) with the first main cutting edge.

The first secondary cutting edge is preferably at a greater distance from the central axis of the tool holder than the first main cutting edge. The first main cutting edge, on the other hand, is preferably at a greater distance from the central axis of the tool holder than the second secondary cutting edge. The first secondary cutting edge thus forms the part of the first cutting insert that has the greatest radial distance from the central axis.

According to a refinement, a first end of the first main cutting edge is connected to the first secondary cutting edge via a first radius. A second end of the first main cutting edge opposite the first end is connected to the second secondary cutting edge via a second radius.

The two radii are preferably radii of a few tenths. They form rounded corners of the first cutting insert, whereby collisions or even a breakout of the corners of the first cutting insert is prevented.

It is understood that the above-mentioned features and those yet to be explained can be used not only in the combination indicated in each case, but also in other combinations or on their own, without departing from the spirit and scope of the present disclosure.

DESCRIPTION OF PREFERRED EMBODIMENTS

Figure 1:
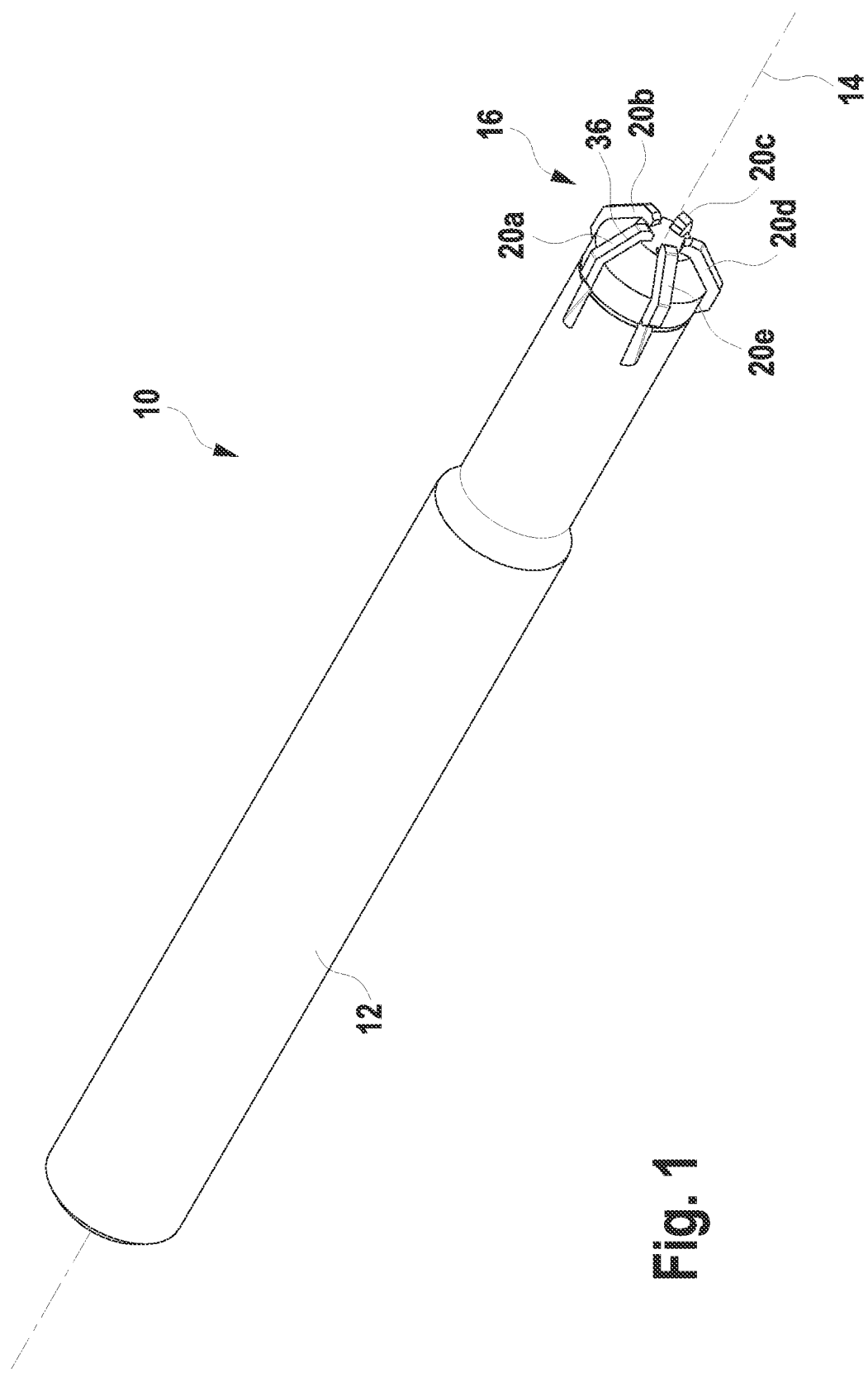
FIG. 1 shows a perspective view of a chamfer tool according to an embodiment.
Figure 2:
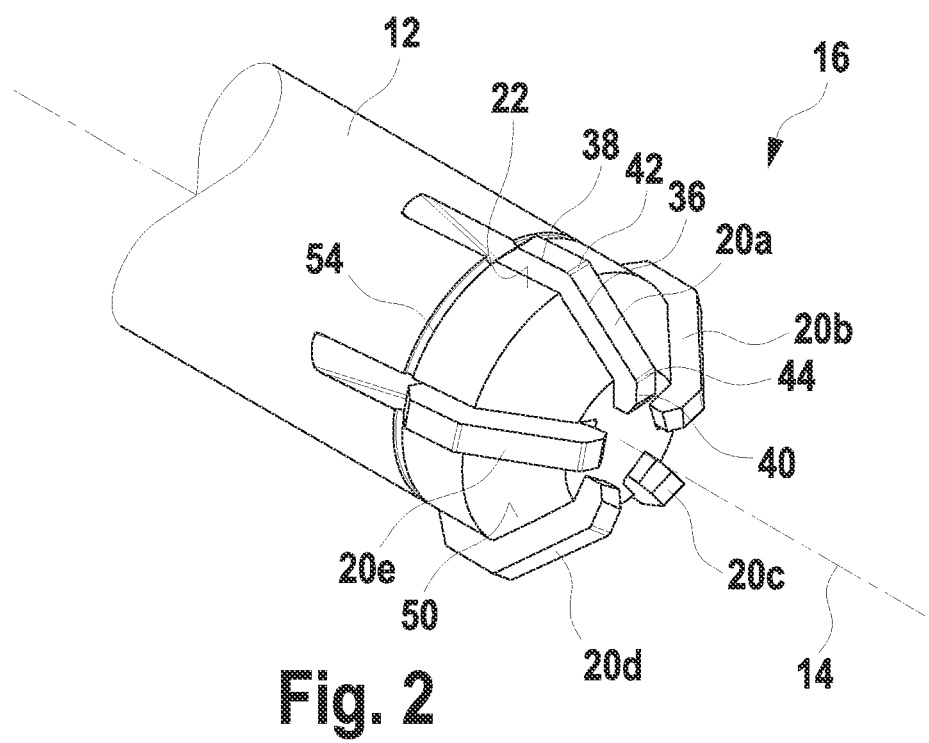
FIG. 2 shows a detail of a machining head of the chamfer tool from FIG. 1 in a perspective view.

FIG. 1 shows a perspective view of an embodiment of the chamfer tool. The chamfer tool is denoted therein in its entirety with the reference numeral 10.

The chamfer tool 10 comprises a tool holder 12 which extends along a central axis 14. The chamfer tool 10 is preferably, but not necessarily, rotationally symmetrical with respect to the central axis 14. In the area of its front end, the chamfer tool 10 comprises a machining head 16 with which a workpiece to be machined is machined.

Figure 5:
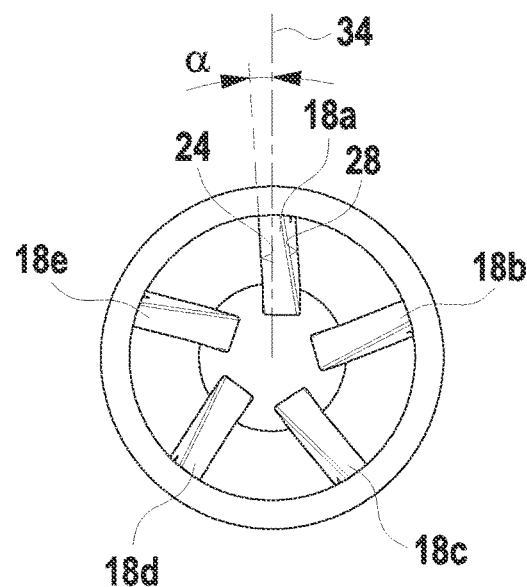
FIG. 5 shows the machining head from FIG. 2 in a top view from the front without cutting inserts inserted therein.

In the herein shown embodiment, the tool holder 12 comprises five cutting insert receptacles 18a-18e in the area of the machining head 16, which cutting insert receptacles are referred to as the first, second, third, fourth and fifth cutting insert receptacles 18a-18e, respectively, for better differentiation (see FIG. 5). The cutting insert receptacles 18a-18e each serve to receive a cutting insert 20a-20e, which are referred to herein as the first, second, third, fourth and fifth cutting insert 20a-20e, respectively.

The cutting insert receptacles 18a-18e and the cutting inserts 20a-20e are preferably evenly distributed around the circumference of the tool holder 12 and around the circumference of the chamfer tool 10, respectively. The tool holder 12 is preferably made of cemented carbide. The cutting inserts 20a-20e are preferably made of CVD thick-film diamond.

Although the chamfer tool 10 is provided with five cutting inserts 20a-20e in the herein shown embodiment, the chamfer tool could also be provided with two, three, four or more than five cutting inserts.

The use of several cutting inserts increases the stability as well as the service life of the chamfer tool 10. However, since the use of only one cutting insert is sufficient for the function of the chamfer tool 10, the method of mounting the cutting inserts 20a-20e within the cutting insert receptacles 18a-18e will be explained in detail below for the sake of simplicity only with reference to the first cutting insert 20a and the first cutting insert receptacle 18a, respectively. When several cutting inserts or cutting insert receptacles are used, the remaining cutting inserts 20b-20e and the remaining cutting insert receptacles 18b-18e, respectively, are preferably configured in the same or equivalent shape.

The first cutting insert receptacle 18a is configured as a slot-shaped or groove-shaped receptacle pocket, which is formed into the tool holder 12 in the area of the machining head 16 and is accessible from outside both in the axial direction, i.e. parallel to the central axis 14, and circumferentially. The first cutting insert 20a is inserted into the first cutting insert receptacle 18a in such a way that it projects both in the axial direction beyond the front end of the tool holder 12 and circumferentially beyond the circumference of the tool holder 12.

The first cutting insert 20a is not only inserted into the first cutting insert receptacle 18a, but is also connected thereto in a firmly bonded manner. Preferably, the first cutting insert 20a is soldered to the tool holder 12 in the first cutting insert receptacle 18a. Particularly preferably, the cutting insert 20a is soldered to the cutting insert receptacle 18a on three of its sides. A first lateral surface 22 of the first cutting insert 20a is soldered to a first lateral abutment surface 24 of the first cutting insert receptacle 18a. An opposite second lateral surface 26 of the first cutting insert 20a is soldered to a second lateral abutment surface 28 of the first cutting insert receptacle 18a. A lower surface 30 of the first cutting insert 20a is soldered to a base abutment surface 32 of the first cutting insert receptacle 18a.

Although it is preferred that the first cutting insert 20a is soldered to the first cutting insert receptacle 18a at all three mentioned surfaces 22, 26, 30, it would be generally conceivable to solder the first cutting insert 20a to the first cutting insert receptacle 18a at only one or two of these surfaces 22, 26, 30. Soldering the first cutting insert 20a at all three named surfaces 22, 26, 30, however, increases the stability of the connection between the first cutting insert 20a and the tool holder 12.

The two opposing lateral abutment surfaces 24, 28 form the flanks of the groove- or slot-shaped first cutting insert receptacle 18a. They preferably run parallel to each other. The base abutment surface 32 extending between the two lateral abutment surfaces 24, 28 forms the base or groove base of the groove- or slot-shaped first cutting insert receptacle 18a. This base abutment surface 32 extends transversely (i.e. not parallel) to the two lateral abutment surfaces 24, 28. Preferably, the base abutment surface 32 is oriented orthogonally to the two lateral abutment surfaces 24, 28.

A similar condition applies to the lateral surfaces 22, 26 and the lower surface 30 of the first cutting insert 20a. The two lateral surfaces 22, 26 preferably extend parallel to each other and transversely (i.e. not parallel) to the lower surface 30. Preferably, the lower surface 30 is oriented orthogonally to the two lateral surfaces 22, 26.

In order to facilitate the insertion of the first cutting insert 20a into the first cutting insert receptacle 18a and in order to be able to introduce solder at said locations between the cutting insert 20a and the lateral flanks 24, 28 of the first cutting insert receptacle 18a, the first cutting insert receptacle 18a is preferably wider than the first cutting insert 20a. Thus, a distance that the two lateral abutment surfaces 24, 28 have from each other is preferably greater than a distance that the two lateral surfaces 22, 26 have from each other.

Although the first cutting insert 20a can generally be inserted exactly radially into the tool holder 12, the first cutting insert receptacle 18a and thus also the first cutting insert 20a are somewhat inclined with respect to the radial direction of the tool holder 12 in the herein shown embodiment. The first lateral abutment surface 24 as well as the second lateral abutment surface 28 each enclose an angle $\alpha$ with the radial direction, which is shown as dashed in FIG. 5 and is provided with the reference numeral 34, which angle is preferably in the range of 0°-5°. The corresponding inclination of the first cutting insert 20a results in a rake angle at the main cutting edge 36 of the first cutting insert 20a.

Furthermore, the two lateral abutment surfaces 24, 28 of the first cutting insert receptacle 18a are preferably also slightly inclined relative to the central axis 14 of the tool holder 12. The corresponding angle of inclination $\beta$ is drawn in FIG. 3 at the fifth cutting insert receptacle 18e. The angle of inclination $\beta$ results in a setting angle at the main cutting edge 36 of the first cutting insert 20a. The angle of inclination $\beta$ preferably has a size in the range of 0°-5°.

The first main cutting edge 36 of the first cutting insert 20a preferably extends at an acute angle relative to the central axis 14 of the tool holder 12. This acute angle is drawn as an angle $\gamma$ in FIG. 3. The chamfering of a workpiece to be machined is performed by means of the main cutting edge 36 of the first cutting insert 20a. Thus, the setting angle $\gamma$ of the main cutting edge 36 is selected according to the chamfer angle to be produced on the workpiece. Depending on the desired chamfer angle, the setting angle $\gamma$ (acute angle) is therefore usually selected in the range of 30°-60°.

In addition to the first main cutting edge 36, the first cutting insert 20a in the herein shown embodiment comprises a first secondary cutting edge 38 and a second secondary cutting edge 40. The first secondary cutting edge 38 preferably runs parallel to the central axis 14 or is slightly inclined with respect thereto, for example by an angle <5°. The second secondary cutting edge 40 runs orthogonally to the central axis 14 or is inclined at an angle <5° to the radial direction 34. The two secondary cutting edges 38, 40 essentially serve to support the machining head 16 on the workpiece to be machined. In principle, however, machining can also be performed with the secondary cutting edges 38, 40. For example, a double chamfer can be produced on the workpiece be means of the first secondary cutting edge 38 and the first main cutting edge 36.

The first secondary cutting edge 38 is connected to a first end 46 of the first main cutting edge 36 via a first radius 42. The second secondary cutting edge 40 is connected to the second end 48 of the first main cutting edge 36 via a second radius 44. The two radii 42, 44 are preferably selected to be relatively small, in the range of a few tenths.

The tool holder 12 is adapted in shape to the cutting inserts 20a-20e in the area of the machining head 16. For this purpose, the tool holder 12 comprises, for example, a conical segment surface 50 which is interrupted by the slot-shaped cutting insert receptacles 18a-18e. This conical segment surface 50 preferably runs parallel to the main cutting edges 36 of the cutting inserts 20a-20e. In other words, a half opening angle of the conical segment surface 50 is equal to the inclination angle $\gamma$ of the main cutting edges 36 of the cutting inserts 20a-20e.

Figure 6:
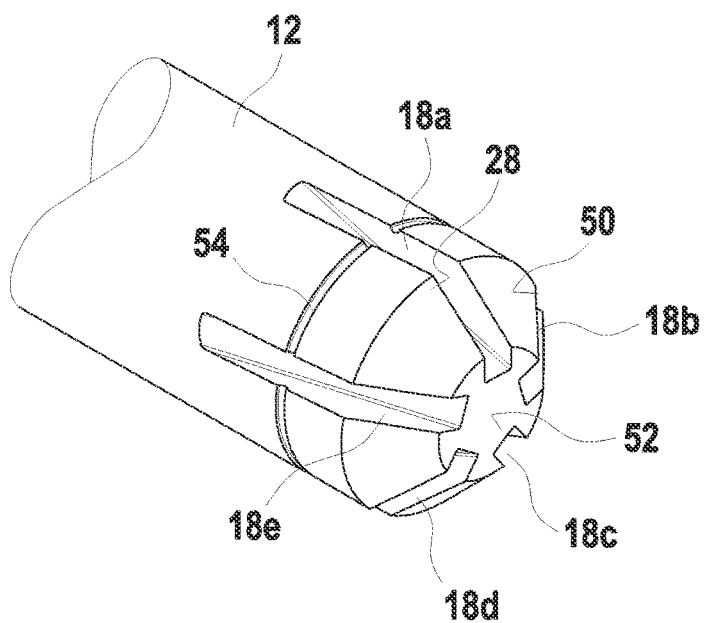
FIG. 6 shows the machining head from FIG. 2 in a perspective view without cutting inserts inserted therein.

At the front end, the tool holder 12 comprises an end face termination surface 52 that is preferably oriented orthogonally to the central axis 14 (see FIG. 6). At the front side of the tool holder 12, the cutting insert receptacles 18a-18e open into the conical segment surface 50 as well as into the end face termination surface 52. At the opposite rear end, the cutting insert receptacles 18a-18e each flatten out towards the rear.

Figure 3:
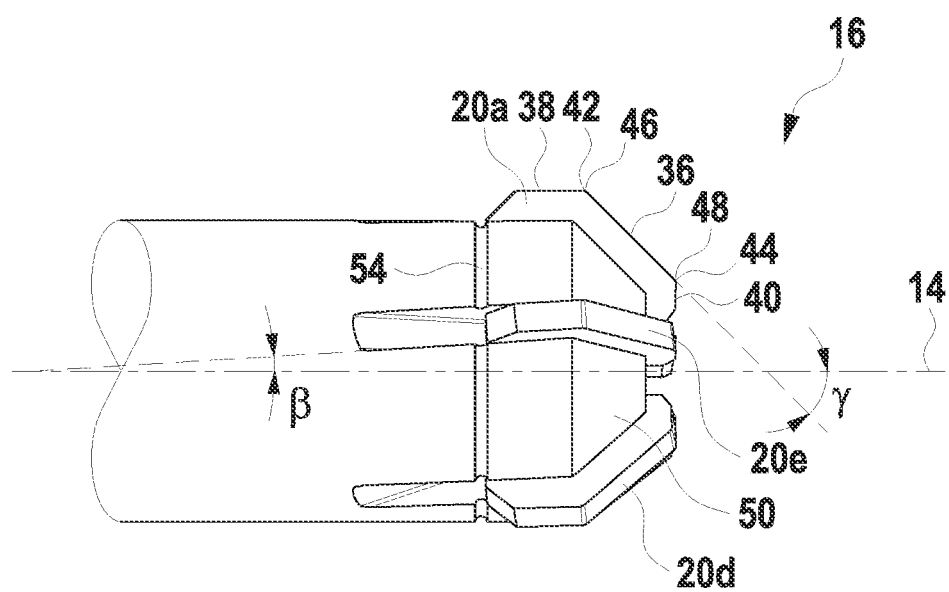
FIG. 3 shows the machining head from FIG. 2 in a side view.
Figure 4:
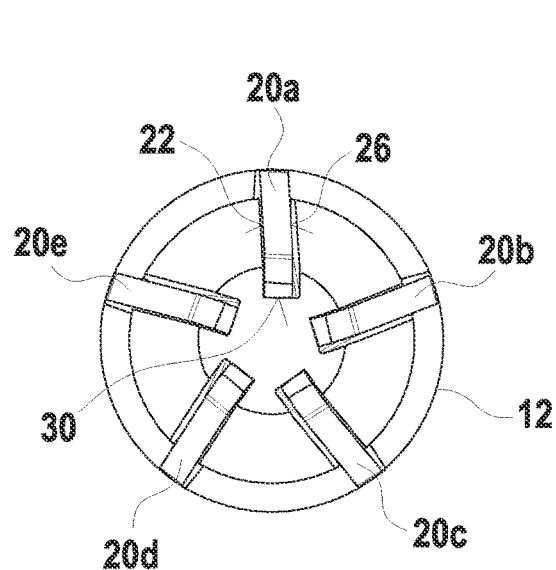
FIG. 4 shows the machining head from FIG. 2 in a top view from the front.

In FIGS. 3 and 6, a groove 54 extending in the circumferential direction can also be seen. This groove 54 is used to attach a positioning device, for example a positioning ring, by means of which the cutting inserts 20a-20e can be aligned with respect to each other in the axial direction during attachment to the tool holder 12. The positioning device (not shown here) can subsequently be removed again as soon as the cutting inserts 20a-20e are fixed in the cutting insert receptacles 18a-18e.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

What is claimed is:

1. A chamfer tool comprising:
   a tool holder, which extends along a central axis and comprises a plurality of slot-shaped cutting insert receptacles that are arranged distributed around a circumference of the tool holder, wherein each of the plurality of cutting insert receptacles comprises two opposing lateral abutment surfaces and a base abutment surface arranged between the two lateral abutment surfaces and extending transversely thereto, the base abutment surface of each of the plurality of cutting insert receptacles forming a base of the respective cutting insert receptacle;
   a plurality of cutting inserts, wherein each of the plurality of cutting inserts is soldered or welded to one of the plurality of cutting insert receptacles, respectively, wherein each of the plurality of cutting inserts comprises two opposing lateral surfaces, which abut against or are soldered or welded to the two lateral abutment surfaces of the respective one of the plurality of cutting insert receptacles in which the respective cutting insert is fixed, and a lower surface arranged between the two lateral surfaces and extending transversely thereto, wherein the lower surface of each of the plurality of cutting inserts abuts against or is soldered or welded to the base abutment surface of the respective one of the plurality of cutting insert receptacles in which the respective cutting insert is fixed, wherein each of the plurality of cutting inserts projects out of the respective one of the plurality of cutting insert receptacles both in an axial direction, which is parallel to the central axis of the tool holder, and transversely to the axial direction, wherein in the axial direction each of the plurality of cutting inserts projects beyond a front end of the tool holder, and wherein each of the plurality of cutting inserts comprises a rectilinear main cutting edge which is oriented at a first acute angle to the central axis of the tool holder, and a first rectilinear secondary cutting edge oriented parallel to the central axis of the tool holder or at a second angle less than 5° to the central axis the tool holder and being shorter than the rectilinear main cutting edge of the respective cutting insert, and a second rectilinear secondary cutting edge oriented at a third angle of 85°-90° to the central axis of the tool holder, wherein the first rectilinear secondary cutting edge of each of the plurality of cutting inserts is spaced from the central axis of the tool holder a greater distance than the rectilinear main cutting edge of the respective cutting insert, and wherein the rectilinear main cutting edge of each of the plurality of cutting inserts is spaced from the central axis of the tool holder a greater distance than the second rectilinear secondary cutting edge of the respective cutting insert.

2. The chamfer tool according to claim 1, wherein the two opposing lateral surfaces of each of the plurality of cutting inserts are soldered to the two lateral abutment surfaces of the respective one of the plurality of cutting insert receptacles in which the respective cutting insert is fixed, and wherein the lower surface of each of the plurality of cutting inserts is soldered to the base abutment surface of the respective one of the plurality of cutting insert receptacles in which the respective cutting insert is fixed.

3. The chamfer tool according to claim 1, wherein the two lateral abutment surfaces of each of the plurality of cutting insert receptacles are oriented parallel to each other, respectively.

4. The chamfer tool according to claim 1, wherein a distance between the two lateral abutment surfaces of each of the plurality of cutting insert receptacles is greater than a distance between the two lateral surfaces of each of the plurality of cutting inserts.

5. The chamfer tool according to claim 1, wherein the two lateral abutment surfaces of each of the plurality of cutting insert receptacles are oriented parallel to a radial direction or at a fourth angle smaller than 5° to the radial direction, wherein the radial direction is orthogonal to the central axis of the tool holder.

6. The chamfer tool according to claim 1, wherein the two lateral abutment surfaces of each of the plurality of cutting insert receptacles are oriented parallel to the central axis of the tool holder or at a fifth angle smaller than 5° to the central axis of the tool holder.

7. The chamfer tool according to claim 1, wherein a first end of each of the plurality of rectilinear main cutting edges is connected to a respective one of the plurality of first rectilinear secondary cutting edges via a first radius, and wherein a second end of each of the plurality of rectilinear main cutting edges is connected to a respective one of the plurality of second rectilinear secondary cutting edge via a second radius.

8. The chamfer tool according to claim 1, wherein the tool holder is made of cemented carbide, and wherein the plurality of cutting inserts are made of CVD diamond.

9. A chamfer tool comprising:
a tool holder, which extends along a central axis and comprises a plurality of slot-shaped cutting insert receptacles that are arranged distributed around a circumference of the tool holder, wherein each of the plurality of cutting insert receptacles comprises two opposing lateral abutment surfaces and a base abutment surface arranged between the two lateral abutment surfaces and extending transversely thereto, the base abutment surface of each of the plurality of cutting insert receptacles forming a base of the respective cutting insert receptacle;
a plurality of cutting inserts, wherein each of the plurality of cutting inserts is soldered or welded to one of the plurality of cutting insert receptacles, respectively, wherein each of the plurality of cutting inserts comprises two opposing lateral surfaces, which abut against or are soldered or welded to the two lateral abutment surfaces of the respective one of the plurality of cutting insert receptacles in which the respective cutting insert is fixed, and a lower surface arranged between the two lateral surfaces and extending transversely thereto, wherein the lower surface of each of the plurality of cutting inserts abuts against or is soldered or welded to the base abutment surface of the respective one of the plurality of cutting insert receptacles in which the respective cutting insert is fixed, wherein each of the plurality of cutting inserts projects out of the respective one of the plurality of cutting insert receptacles both in an axial direction, which is parallel to the central axis of the tool holder, and transversely to the axial direction, and wherein each of the plurality of cutting inserts comprises a rectilinear main cutting edge which is oriented at a first acute angle to the central axis of the tool holder, wherein each of the plurality of cutting inserts projects beyond a front end of the tool holder, and wherein the tool holder comprises, in an area of the front end, a conical segment surface which is interrupted by the plurality of slot-shaped cutting insert receptacles, wherein the two lateral abutment surfaces of each of the plurality of cutting insert receptacles are oriented parallel to each other, respectively, and wherein the two lateral abutment surfaces of each of die plurality of cutting insert receptacles are oriented parallel to a radial direction or at an angle smaller than 5° to the radial direction, wherein the radial direction is orthogonal to the central axis of the tool holder.

10. The chamfer tool according to claim 9, wherein a half opening angle of the conical segment surface is equal to the first acute angle.

* * * * *